US009659397B2

(12) United States Patent
Sumner et al.

(10) Patent No.: US 9,659,397 B2
(45) Date of Patent: *May 23, 2017

(54) RIG-BASED PHYSICS SIMULATION

(71) Applicant: Disney Enterprises, Inc., Burbank, CA (US)

(72) Inventors: Robert Sumner, Zurich (CH); Fabian Hahn, Zurich (CH); Stelian Coros, Zurich (CH); Bernhard Thomaszewski, Zurich (CH); Sebastian Martin, Zurich (CH); Markus Gross, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 13/843,856

(22) Filed: Mar. 15, 2013

(65) Prior Publication Data

US 2014/0198106 A1 Jul. 17, 2014

Related U.S. Application Data

(60) Provisional application No. 61/751,747, filed on Jan. 11, 2013.

(51) Int. Cl.
*G06T 13/40* (2011.01)
(52) U.S. Cl.
CPC ................................... *G06T 13/40* (2013.01)
(58) Field of Classification Search
None
See application file for complete search history.

(56) References Cited

U.S. PATENT DOCUMENTS

| 6,195,625 | B1 * | 2/2001 | Day et al. | 703/7 |
| 6,522,331 | B1 * | 2/2003 | Danks | G06T 13/40 345/473 |
| 7,403,202 | B1 * | 7/2008 | Nash | G06T 7/2033 345/474 |
| 8,054,313 | B1 * | 11/2011 | Baraff et al. | 345/475 |
| 8,269,778 | B1 * | 9/2012 | Baraff et al. | 345/473 |

(Continued)

OTHER PUBLICATIONS

Blender "Docs > Physics > Soft Body > Settings" posted Apr. 10, 2009 https://www.blender.org/manual/physics/soft_body/settings.html.*

(Continued)

*Primary Examiner* — Barry Drennan
*Assistant Examiner* — Jason Pringle-Parker
(74) *Attorney, Agent, or Firm* — Sheppard, Mullin, Richter & Hampton LLP

(57) ABSTRACT

A method is disclosed for applying physics-based simulation to an animator provided rig. The disclosure presents equations of motions for simulations performed in the subspace of deformations defined by an animator's rig. The method receives an input rig with a plurality of deformation parameters, and the dynamics of the character are simulated in the subspace of deformations described by the character's rig. In certain embodiments, the present disclosure provides a method that transforms stiffness values defined on rig parameters to a non-homogeneous distribution of material parameters for the underlying rig.

21 Claims, 11 Drawing Sheets

(56) References Cited

U.S. PATENT DOCUMENTS

| | | | |
|---|---|---|---|
| 8,599,197 B1* | 12/2013 | Yu | G06T 17/20 345/419 |
| 8,704,823 B1* | 4/2014 | Waggoner et al. | 345/419 |
| 8,902,234 B1* | 12/2014 | Sanocki | G06T 13/00 345/473 |
| 9,098,944 B2* | 8/2015 | Witkin et al. | |
| 2006/0106494 A1* | 5/2006 | Alvarez et al. | 700/251 |
| 2006/0139347 A1* | 6/2006 | Choi et al. | 345/419 |
| 2007/0092121 A1 | 4/2007 | Periaswamy | |
| 2008/0309664 A1* | 12/2008 | Zhou et al. | 345/420 |
| 2009/0174703 A1* | 7/2009 | Hermanson et al. | 345/419 |
| 2010/0134501 A1* | 6/2010 | Lowe | G06T 13/40 345/474 |
| 2012/0281019 A1* | 11/2012 | Tamstorf | G06T 3/0093 345/646 |
| 2013/0120404 A1* | 5/2013 | Mueller | G06T 13/00 345/474 |
| 2014/0035901 A1* | 2/2014 | Chen | G06T 13/40 345/419 |

OTHER PUBLICATIONS

Baran, I., and Popovic, J., Automatic rigging and animation of 3D characters, Proc. of ACM SIGGRAPH '07, 2007.

Barbic, J., and James, D. L., Real-time subspace integration for st. venant-kirchhoff deformable models, Proc. of ACM SIGGRAPH '05, 2005, 982-990.

Barbic, J., and James, D. L., Subspace self-collision culling, ACM Trans. on Graphics (SIGGRAPH 2010), 2010, 81:1-81:9, 29, 3.

Barbic, J., and Zhao, Y., Real-time large-deformation substructuring, ACM Trans. on Graphics (SIGGRAPH 2011), 2011, 91:1-91:7, 30, 4.

Barr, A. H., Global and local deformations of solid primitives, Computer Graphics (Proceedings of SIGGRAPH 84), 1984, 21-30, vol. 18.

Capell, S., Green, S., Curless, B., Duchamp, T., and Popovic, Z., Interactive skeleton-driven dynamic deformations, Proc. of ACM SIGGRAPH '02, 2002, 586-593.

Coros, S., Beaudoin, P., and Van De Panne, M., Generalized biped walking control, ACM Transctions on Graphics, 2010, 29, 4, Article 130.

Dambreville, S., Rathi, Y., and Tannenbaum, A., Shapebased approach to robust image segmentation using kernel pca, Computer Vision and Pattern Recognition, 2006 IEEE Computer Society Conference on, 2006, 977-984, vol. 1.

Faloutsos, P., Van De Panne, M., and Terzopoulos, D., Dynamic free-form deformations for animation synthesis, IEEE Transactions on Visualization and Computer Graphics, 1997, 201-214, 3 (July).

Gilles, B., Bousquet, G., Faure, F., and Pai, D., Frame-based elastic models, ACM Trans. on Graphics, 2011, 30, 2.

Hughes, T. J. R., The Finite Element Method. Linear Static and Dynamic Finite Element Analysis, 2000, Dover Publications.

Irving, G., Teran, J., and Fedkiw, R., Invertible finite elements for robust simulation of large deformation, Proc. of Symp. on Computer Animation (SCA '04), 2004, 131-140.

James, D. L., and Fatahalian, K., Precomputing interactive dynamic deformable scenes, in ACM SIGGRAPH 2003 Papers (SIGGRAPH '03), 2003, 879-887, ACM, New York, NY, USA.

Joshi, P., Meyer, M., Derose, T., Green, B., and Sanocki, T., Harmonic coordinates for character articulation, ACM SIGGRAPH 2007 papers (SIGGRAPH '07), 2007, ACM, New York, NY, USA.

Ju, T., Zhou, Q.-Y., Van De Panne, M., Cohen-Or, D., and Neumann, U., Reusable skinning templates using cage-based deformations, ACM Trans. Graph. 27 (Dec. 2008), 122:1-122:10.

Kim, T., and James, D. L., Skipping steps in deformable simulation with online model reduction, ACM SIGGRAPH Asia 2009 papers (SIGGRAPH Asia '09), 2009, 123:1-123:9, ACM, New York, NY, USA.

Krausea, R., and Walloth, M., A time discretization scheme based on rothe's method for dynamical contact problems with friction, Computer Methods in Applied Mechanics and Engineering, 2009, 199, 1-4, 1-19.

Krysl, P., Lall, S., and Marsden, J. E., Dimensional model reduction in non-linear finite element dynamics of solids and structures, International Journal for Numerical Methods in Engineering, 2001, 479-504, 51, 4.

Levin, D. I. W., Litven, J., Jones, G. L., Sueda, S., and Pai, D. K., Eulerian solid simulation with contact, ACM Transactions on Graphics, 2011, 36:1-36:10, 30, 4 (Aug).

Lewis, J. P., Cordner, M., and Fong, N., Pose space deformation: a unified approach to shape interpolation and skeleton-driven deformation, Proc. of ACM SIGGRAPH '00, 2000, 165-172.

Li, H., Weise, T., and Pauly, M., Example-based facial rigging, ACM Trans. Graph., 2010, 32:1-32:6, 29 (July).

Magnenat-Thalmann, N., Laperriere, R., and Thalmann, D., Joint-dependent local deformations for hand animation and object grasping, Proceedings on Graphics interface '88, 1988, 26-33.

Martin, S., Thomaszewski, B., Grinspun, E., and Gross, M., Example-based elastic materials, ACM Trans. on Graphics (Proc. SIGGRAPH), 2011, 72:1-72:8, 30, 4.

McAdams, A., Zhu, Y., Selle, A., Empey, M., Tamstorf, R., Teran, J., and Sifakis, E., Efficient elasticity for character skinning with contact and collisions, Proc. of ACM SIGGRAPH '11, 2011, 37:1-37:12.

Nocedal, J., and Wright, S. J., Numerical Optimization, 2006, Springer, August.

Rohmer, D., Hahmann, S., and Cani, M.-P., Exact volume preserving skinning with shape control, Proc. of Symp. on Computer Animation '09, 2009, 83-92.

Savoye, Y., and Franco, J.-S., CagelK: dual-laplacian cage-based inverse kinematics, Proceedings of the 6th International conference on Articulated motion and deformable objects (AMDO'10), 2010, 280-289, Springer-Verlag, Berlin, Heidelberg.

Sederberg, T. W., and Parry, S. R., Free-form deformation of solid geometric models, Computer Graphics (Proceedings of ACM SIGGRAPH 86), 1986, 151-160, vol. 20.

Seol, Y., Seo, J., Kim, P. H., Lewis, J. P., and Noh, J., Artist friendly facial animation retargeting, ACM Trans. on Graphics (Proc. SIGGRAPH Asia '11), 2011.

Singh, K., and Fiume, E. L., Wires: A geometric deformation technique, Proceedings of ACM SIGGRAPH 1998, Computer Graphics Proceedings, Annual Conference Series, 1998, 405-414.

Sloan, P.-P. J., Rose, III, C. F., and Cohen, M. F., Shape by example, Proceedings of the 2001 symposium on Interactive 3D graphics, 2001, 135-143, ACM Press.

Frohlich, S., Botsch, M., Example-driven deformations based on discrete shells, Computer Graphics Forum, 2011, 2246-2257, 30.

Sumner, R. W., Zwicker, M., Gotsman, C., and Popovic, J., Mesh-based inverse kinematics, ACM Trans. Graph, 2005, 488-495, 24 (July).

Whitaker, H., and Halas, J., Timing for Animation, 2002, Focal Press.

Hahn, F., Martin, S., Thomaszewski, B., Coros, S., Sumner, R., Gross, M., Rig-Space Physics, ACM Transactions on Graphics (TOG)—Proceedings of ACM SIGGRAPH 2012, 2012, 31, 4, 72.

Mclaughlin, Tim, Larry Cutler, and David Coleman., "Character rigging, deformations, and simulations in film and game production." ACM SIGGRAPH 2011 Courses. ACM, 2011.

Capell, Steve, et al., "Physically based rigging for deformable characters." Proceedings of the 2005 ACM SIGGRAPH/Eurographics symposium on Computer animation. ACM, 2005.

Kim, Junggon, and Nancy S. Pollard., "Fast simulation of skeleton-driven deformable body characters." ACM Transactions on Graphics (TOG) 30.5 (2011): 121.

Meredith, Michael, and Steve Maddock., "Using a half-jacobian for real-time inverse kinematics." Proceedings of the International Conference on Computer Games: Artificial Intelligence, Design and Education. 2004.

(56) References Cited

OTHER PUBLICATIONS

Ryan Grady, Aran Stubbs, Louis Ronat, "Rhythm and Hues #3: Solving Large Linear Systems by Algebraic Multigrid", Final Report. Field Session 2005, http://eecs.mines.edu/Courses/csci370/FS2005/R&H3.doc.
Cyberbotics, "7.3 Tutorial 2: Modification of the Environment (20 minutes)", posted Dec. 10, 2011, Cyberbotics ltd, https://www.cyberbotics.com/guide/tutorial-2-modification-of-the-environment-20-minutes.php.
Wei, Xiaolin, Jianyuan Min, and Jinxiang Chai. "Physically valid statistical models for human motion generation." ACM Transactions on Graphics (TOG) 30.3 (2011 ): 19.

* cited by examiner

RIG-BASED PHYSICS SIMULATION

CROSS-REFERENCE TO RELATED APPLICATIONS

This application claims the benefit of U.S. Provisional Application No. 61/751,747, filed Jan. 11, 2013.

TECHNICAL FIELD

The present disclosure relates generally to computer animation, and, more particularly, to a method for performing physics-based simulations on an animator's rig.

DESCRIPTION OF THE RELATED ART

Character animation is a vital component of contemporary computer games and film productions. Deformation is encoded in the rigging stage when artists carefully design the character's range of meaningful deformations in terms of a low-dimensional set of intuitive control parameters. The character's movement is determined during the animation phase, when animators set values for the control parameters over time in order to bring the character to life and make it act.

BRIEF SUMMARY OF THE DISCLOSURE

A method is disclosed that brings the benefits of physics-based simulations to traditional animation pipelines. Equations of motion are formulated in the subspace of deformations defined by an animator's rig. The framework fits into the workflow typically employed by artists, as the output consists of animation curves that are identical in nature to the result of manual key framing. Artists are therefore capable of exploring the full spectrum between hand-crafted animation and unrestricted physical simulation. To enhance the artist's control, a method is provided that transforms stiffness values defined on rig parameters to a non-homogeneous distribution of material parameters for the underlying finite element method (FEM) model. In addition, automatically extracted high-level rig parameters are used to intuitively edit the results of our simulations, and also to speed up computation. In the absence of artist input, realistic passive motion is created directly in rig space.

One embodiment of the disclosed method comprises receiving an articulated animation rig, the rig having a plurality of controls, the controls at least partially defining a deformation space. A physics-based simulation is performed, the simulation being constrained by the deformation space of the rig. Keyframes are generated on some or all of the controls as a result of the simulation. In a more particular embodiment, the method further comprises receiving material stiffness data on a subset of the rig controls, wherein the simulation is both constrained by the deformation space and influenced by the material stiffness data.

The present disclosure is also embodied in a non-transitory computer readable medium comprising an instruction set configured to cause a computing device to perform the steps of the disclosed method.

Other features and aspects of the disclosure will become apparent from the following detailed description, taken in conjunction with the accompanying drawings, which illustrate, by way of example, the features in accordance with various implementations.

BRIEF DESCRIPTION OF THE DRAWINGS

The drawings are provided for purposes of illustration only and merely depict typical or example implementations. These drawings are provided to facilitate the reader's understanding and shall not be considered limiting of the breadth, scope, or applicability of the disclosure. For clarity and ease of illustration, these drawings are not necessarily to scale.

DETAILED DESCRIPTION

1. Introduction

Character animation is a vital component of contemporary computer games and film productions. For animated movies in particular, a character's deformation and movement are both critical to convey its personality and style. Deformation is encoded in the rigging stage when artists carefully design the character's range of meaningful deformations in terms of a low-dimensional set of intuitive control parameters. The character's movement is determined during the animation phase, when animators set values for the control parameters over time in order to bring the character to life and make it act.

Believable and compelling animation, however, requires careful consideration of the complex physical forces involved in movement in order to give weight and substance to an otherwise empty and weightless shape. Manual keyframe animation affords the greatest degree of creative freedom and permits extremely expressive animation. However, grounding this expressive acting with physically realistic motion due to inertia, deformation propagation, or collision reaction can be extremely cumbersome and time consuming. Physics-based methods excel at creating such realistic effects, but are inherently difficult to control and do not respect the style of deformation chosen for the character and encoded in its rigging controls. This disconnect between the workflow used by artists (manually keyframing a small set of rig parameters) and the output of physics-based simulations (a high number of independent degrees of freedom) limits the effectiveness of physical simulation in the animation pipeline. To date, artists must choose between laboriously keyframing physical effects or employing physics-based tools that offer limited control and may not respect the character's range of meaningful deformations.

Figure 1:
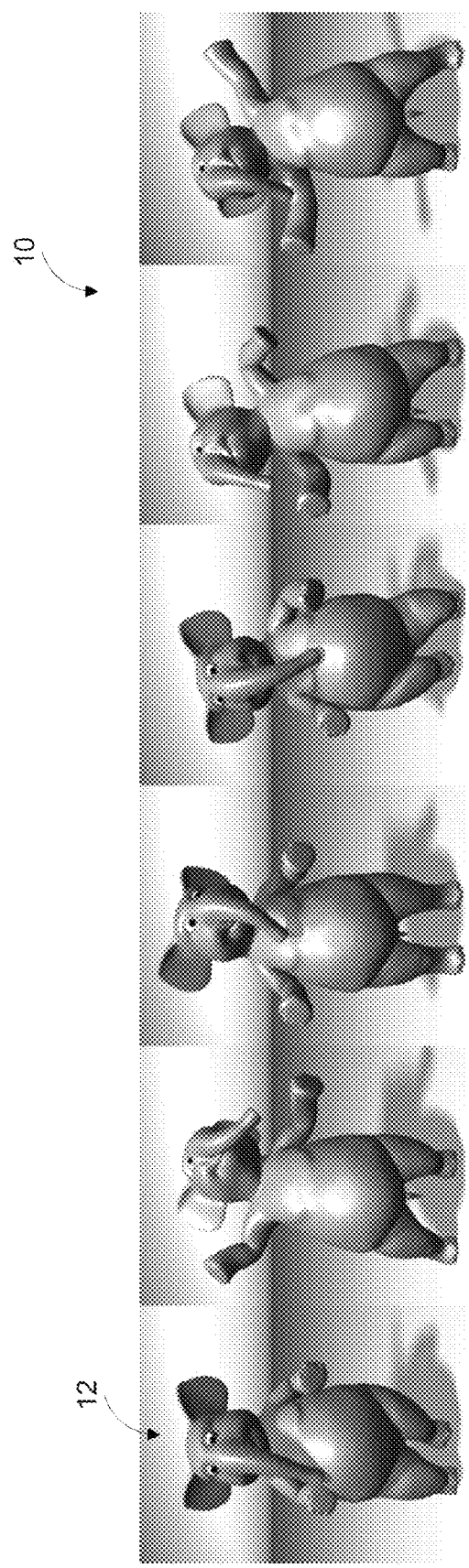
FIG. 1 illustrates a set of sample keyframes generated by receiving a character rig and a set of keyframes for some of the rig's parameters, then automatically producing animation curves for the remaining parameters.

In one embodiment, the present disclosure unifies keyframing and physical simulation to create physically realistic motion of rigged characters. To this end, an underlying representation of the character may be created based on an elastic deformable material. The dynamics of the character may then be simulated in the subspace of deformations described by the character's rig. The disclosed method may treat all rigging controls in a unified manner and thus works with skeletons, blend shapes, spatial deformation fields, or any other rigging procedure. Moreover, the output of the disclosed method may consist of animation keyframes for the rig parameters, making editing convenient for the artist. A sample result of this method is provided in FIG. 1. FIG. 1 provides a set of screenshots 10 in which the disclosed system was provided an elephant character rig 12 and a set of keyframes for some of the character rig's parameters. Animation curves are automatically produced for the remaining parameters by solving the equations of motion in the space of deformations defined by the rig. The resulting motion is physically plausible, maintains the original artistic intent, and is easily editable.

The disclosed approach can provide artists with a tool to continuously move in the spectrum between fully controlled hand-animation and free physical simulation. The present disclosure demonstrates one embodiment of the method as a plugin to a general-purpose 3D animation software and results are demonstrated on complex characters using a variety of real-world rigging controls. Further, the basic framework may be extended in the following ways:

Rig-space Materials: A novel approach is presented to define material stiffnesses directly on the rig parameters by inferring the required stiffness distribution on the background finite element mesh.

Physics-based High Level Rig Parameters: Analyzing physical deformations computed with the disclosed framework yields a set of high-level rig parameters that capture the main dynamic behavior of the simulated character. This enables artists to intuitively edit the output of the disclosed system by modifying only a small number of animation curves. Creating new motions in this new reduced parameter space results in significant performance gains, while maintaining the expressive power of the original set of parameters.

Physics-based Inverse Kinematics: The physical background model allows a user to decouple the way in which deformation is measured from the actual rig and therefore enables the user to perform inverse kinematics on any kind of rig construction. Artists may pose the entire character by specifying only the position or value of isolated handles/parameters, with the remaining parameter values then being obtained by minimizing the elastic energy in rig space, as will be discussed in greater detail below.

2. Related Work

Rigging a character typically refers to the process of embedding a skeleton in a surface mesh and defining how the mesh vertices are transformed according to skeletal motions. In this disclosure, the term is used in a more general way to denote a nonlinear mapping between a low-dimensional space of rig parameters and a high-dimensional surface mesh. In practice, this mapping takes many forms, including classic techniques such as skeleton-based methods, wire deformations, nonlinear functions, blend shape animation, and free-form deformation, all of which are implemented in some form in modern animation software. Since such a wide variety of rigging methods exists, the disclosed rig-based physics method has been designed to treat the rigging system as a black-box so that it can work with any of the methods mentioned above. This disclosure demonstrates the results using skeletons, cage and curve deformers, and blend shape rigs.

The present formulation is grounded on continuum mechanics principles, and its well-established discretizations. In addition, the formulation enables the use of any nonlinear rig as a black-box. Moreover, the disclosed system performs principal component analysis (PCA) in the parameter domain of the animator's rig, which results in an arbitrarily nonlinear mapping between rig parameters and vertex coordinates. Thus, expressive physical deformation modes can be extracted which are linear in rig space but still very expressive due to the rig's nonlinear nature.

3. Rig-Based Simulation

In order to formulate the dynamics of deformable objects in the subspace of deformations defined by an animation rig, the first consideration is to establish the deformable materials' equations of motion (EOM)

$$\rho \ddot{x} = f(x)$$

for the continuous solution x(X, t), where X are the coordinates of the undeformed configuration, t denotes time, $\rho$ describes the mass density of the material and f(x) represents the internal and external force densities acting on the system. While conventional simulators typically discretize these equations (EOM) in space first, the disclosed method first discretizes in time. The unconditionally stable implicit Euler integration scheme is chosen $$\rho\left(\frac{x_{n+1} - x_n}{h^2} - \frac{v_n}{h}\right) = f(x_{n+1})$$

where h is the size of the timestep. This specific choice of time integration allows for the problem to be examined in its variational form as the minimization of the following nonlinear functional:

$$H[x_{n+1}] = \frac{\rho h^2}{2}\left|\left(\frac{x_{n+1} - x_n}{h^2} - \frac{v_n}{h}\right)\right|^2 + W(x_{n+1}), \quad \text{Equation (1)}$$

where W represents the sum of internal and external potential energy densities $W_{int} + W_{ext}$ such that $-\partial_x W = f$. The external potential energy density accounts for the effects of gravity and penalty-based collisions.

Using this variational form, an appropriate spatial discretization can now be chosen to obtain the final formulation of the equations of motion for deformable objects. It is noted that performing the temporal and spatial discretization in this order is very convenient when choosing a nonlinear subspace for the spatial discretization, which is the case for the problem formulation of the disclosed method. This point will be discussed in more depth later on, when the ingredients for certain embodiments of the simulation environment are described in greater detail.

The system may take as input an arbitrary character rig, and optionally, prescribed keyframed trajectories for a subset of the rig parameters. The dynamics formulation operates on the remaining subset of "free" rig parameters, as discussed in the remainder of this disclosure. After every time step, the values output for these rig parameters are recorded. This results in animation curves similar in nature to those that an artist might create through keyframing.

The input animation rig can be treated as a black-box, nonlinear mapping between rig parameters p and the rigged surface mesh s. In other words, it can be assumed that the system only has access to the map $$p \to s(p). \quad \text{Equation (2)}$$

This increases the generality of the approach, making it applicable to virtually any type of rig parameterization. As will be described shortly, the disclosed method may receive the derivatives of the map $$\frac{\partial s}{\partial p}$$

and $$\frac{\partial^2 s}{\partial p^2}.$$

Alternatively, if these are not provided with the rig, then they may be estimated using, for example, finite differences. In this way, the method may be used with standard animation packages such as Maya.

To spatially discretize the variational problem (1) and make use of the provided rig parameterization (2) the standard FEM procedure is followed. First, the volumetric problem domain Ω is divided, which is bounded/defined by the input surface mesh, into a set of distinct finite elements with nodal degrees of freedom (DOFs) x. The effect of the rig on the deformable object may be captured by ensuring that a subset of the nodal DOFs come from the rigged surface mesh that is provided as input:

$$x = \{n\} \cup \{s\}$$

The internal nodal DOFs n may be used in order to ensure a good-quality space discretization irrespective of the input rigged surface mesh. In addition, it should be noted that they are independent of the rig parameters p, because the input rig generally deforms just a surface mesh (i.e. mesh vertices s), and not an arbitrary volumetric region in space. The volumetric solution field approximating the continuous solution x is given by $$x(X) \approx \sum_i x_i N_i(X) = \sum_j n_j N_j(X) + \sum_k s_k N_k(X)$$

where N(X) are basis functions associated with the nodal DOFs.

This formulation may be independent from the actual FEM discretization or material model chosen, as long as the nodal degrees of freedom s can be incorporated. For simplicity tetrahedral elements may be chosen with linear basis functions in combination with standard Saint-Venant Kirchhoff or Neo-Hookean material models for the internal energy density $W_{int}$. Specifically, this allows replacement of the continuous mass and energy densities with their discrete counterparts $$\rho \to M_n, M_s$$

$$W(x(X)) \to W(n,s),$$

where standard mass lumping is used. Further, this allows reformulation of (1) in this discrete setting as $$H(n, p) = \frac{h^2}{2} \left( \frac{n - n_n}{h^2} - \frac{v_n}{h} \right)^T M_n \left( \frac{n - n_n}{h^2} - \frac{v_n}{h} \right) + \quad \text{Equation (3)}$$
$$\frac{h^2}{2} \left( \frac{s(p) - s_n}{h^2} - \frac{w_n}{h} \right)^T M_s \left( \frac{s(p) - s_n}{h^2} - \frac{w_n}{h} \right) + W(n, s(p)),$$

where v and w are the velocities of n and s, respectively, and the subscript n indicates the previous time step. To perform simulations in the reduced subspace provided by the rig, Eq. (3) may be minimized as a function of the interior vertices n and rig parameters p, as described in Section 4.

There are many options when it comes to deriving the algorithmic framework for reduced subspace simulators. The classic Lagrangian mechanical derivation of reduced space mechanics starts from a formulation of kinetic and potential energy in reduced coordinates and derives the continuous EOMs by formulating the Euler-Lagrange equations of the action integral. Formulating the action integral directly in the reduced, non-linear subspace (as opposed to the usual flat Sobolev space $H_1(\Omega)$), results however in more involved formulations than the one used here. The additional complexity is reflected in higher-order curvature terms that account for the non-linearities in the solution manifold. One way of circumventing this additional complexity is to use a linear subspace. While this greatly simplifies simulations in reduced spaces, a large number of dimensions may be needed in order to capture interesting dynamic behaviors. In addition, since the simulation subspace is provided in the form of an animation rig, which, more often than not is non-linear, this is not an option for the problem addressed here.

By considering a first-order, implicit time integration scheme from the start and formulating the corresponding variational form before performing the spatial discretization into a nonlinear subspace, a much simpler formulation is found that does not require higher order derivatives at the current timestep. The curved, non-linear manifold may instead be approximated by additional information from the last discrete timestep $(x_n, v_n)$ and the temporal finite difference approximation. Such a scheme is simple to implement, while still exploiting the flexibility of nonlinear solution subspaces.

4. Minimization

The problem formulation derived in the previous section allows the timestepping procedure to be described as a minimization of the nonlinear objective function presented in Eq. (3). In order to efficiently minimize this objective for each timestep, a Newton-Raphson minimization scheme can be extended to achieve better performance for the specific setting presented here.

A first condition for a minimum may be stated as $[\partial_n H, \partial_p H]^T = 0$, corresponding to the conventional equations of motion for interior vertices $$\partial_n H = M_n \left( \frac{n - n_n}{h^2} - \frac{v_n}{h} \right) + \partial_n W(n, s(p))$$
$$= 0$$

as well as rig parameters $$\partial_p H = J_s(p)^T M_s \left( \frac{s(p) - s_n}{h^2} - \frac{w_n}{h} \right) + J_s(p)^T \partial_s W(n, s(p))$$
$$= 0$$

where the notation $$J_s(p) = \frac{\partial s}{\partial p}$$

is used. In order to solve this coupled system of nonlinear equations using a Newton scheme, correction directions $[\Delta n_k, \Delta p_k]^T$ can be solved for in each iteration by solving the linear system $$\begin{bmatrix} H_{nn} & H_{np} \\ H_{pp} & H_{pp} \end{bmatrix} \begin{bmatrix} \Delta n_k \\ \Delta p_k \end{bmatrix} = - \begin{bmatrix} \partial_n H \\ \partial_p H \end{bmatrix}, \quad \text{Equation (4)}$$

that involve second derivatives of the objective function. They are given analytically as $$H_{nn} = \frac{1}{h^2} M_n + \partial_{nn} W(n, s(p)) \quad \text{Equation (5)}$$

$$H_{pn} = J_s(p)^T \partial_{sn} W(n, s(p))$$

$$H_{pp} = J_s(p)^T \left( \frac{1}{h^2} M_s + \partial_{ss} W(n, s(p)) \right) J_s(p) +$$

$$\partial_p J_s(p)^T M_s \left( \frac{s(p - s_n)}{h^2} - \frac{w_n}{h} \right) + \partial_p J_s(p)^T \partial_s W(n, s(p)).$$

Once the correction directions are computed, a line search method may be used to find an appropriate scalar value a. The updated values for the unknowns n and p are then given by:

$$n_{k+1} = n_k + \alpha_k \Delta n_k$$

$$p_{k+1} = p_k + \alpha_k \Delta p_k$$

Figure 2:
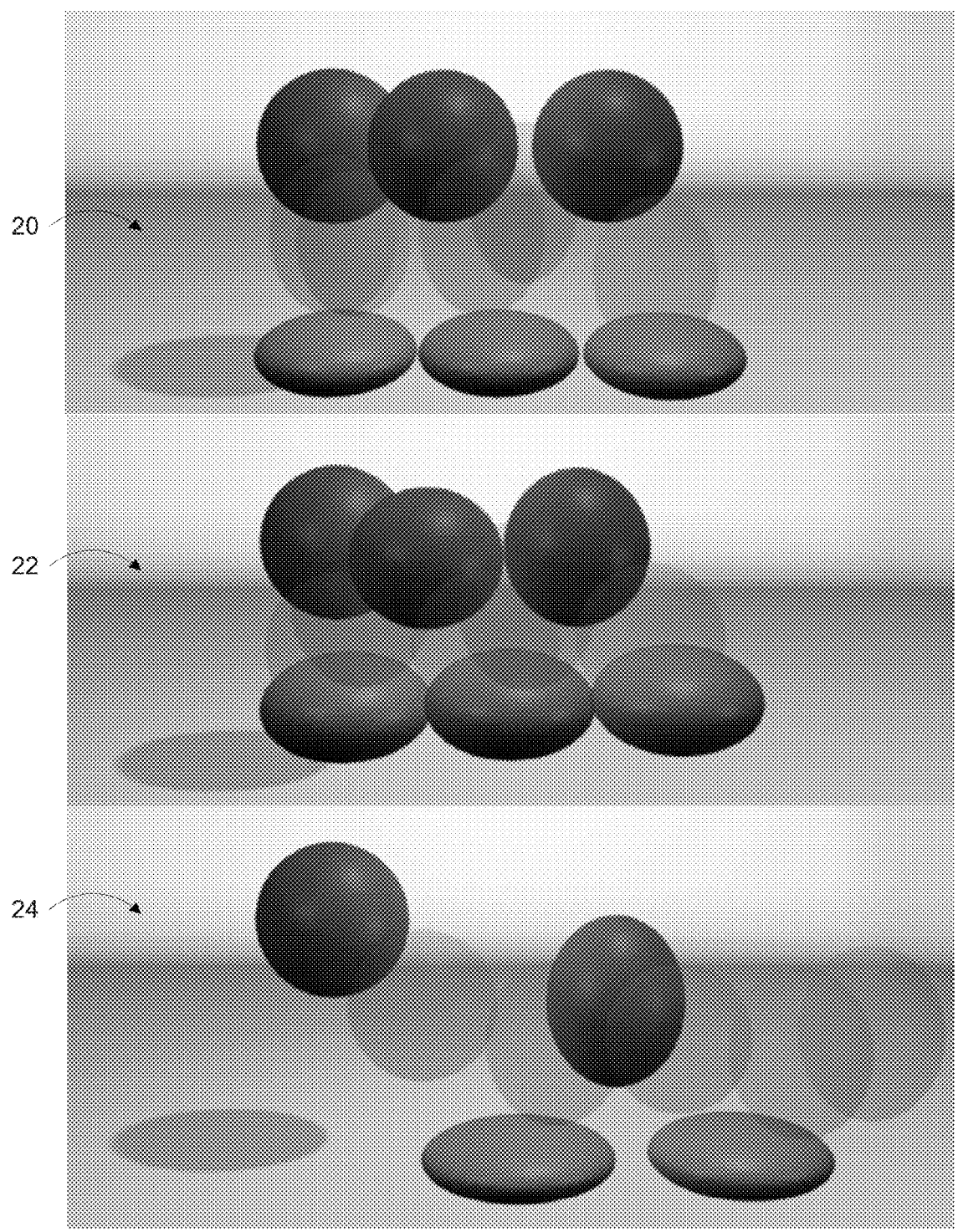
FIG. 2 illustrates an example animated sphere with an artist-created animation (top), a global translation with scaling parameters simulated (middle), and all rig parameters simulated (bottom).

The line search parameter $\alpha_k$ may be computed by performing cubic interpolation to previous function and gradient evaluations while satisfying the Wolfe conditions for sufficient descent. An example of this approach applied to a rigged sphere is shown in FIG. 2, in which a sphere with scaling and global translation rig parameters is depicted. The top row 20 is an artist-created animation. The spheres in the middle row 22 have constrained global translation with scaling parameters being simulated. Finally, in the bottom row 24, all the rig parameters were simulated.

Evaluating second derivatives analytically can be computationally expensive when a black box rig is used, as the Jacobian derivatives $\partial_p J_s(p)$ need to be approximated with finite differences. This results in $p^2$ rig evaluations s(p) for each Newton iteration.

Due to this fact, it may be advantageous to choose solutions that require as little use of the black box rig as possible. If analytic rig Jacobians are not provided, superlinearly convergent quasi-Newton methods may be used, such as the Broyden-Fletcher-Goldfarb-Shanno (BFGS) method. This method updates an approximate Hessian $\tilde{B}_{k+1}$ at each Newton step by using a series of rank-2 updates involving the gradient:

$$\tilde{B}_{k+1} = \tilde{B}_k + \frac{y_k y_k^T}{y_k^T d_k} - \frac{\tilde{B}_k d_k d_k^T \tilde{B}_k}{d_k^T H_k d_k}$$

where $d_k = [\Delta n^T, \Delta p^T]^T$ and $y_k$ is the gradient difference between the current and the last iteration's gradient of H. The BFGS method may be used to update the $H_{pp}$ block of the full system Hessian. $H_{nn}$ is much larger, sparse, and easy to evaluate analytically. The performance gained by reducing the number of calls to the black box rig can be weighed against the loss in convergence introduced by using approximate Hessians.

The blocks of the system matrix in Equation (4) have different sparsity structures. While $H_{nn}$ is very sparse, the blocks $H_{pn}$ and $H_{pp}$ are dense due to the subspace projection with $J_s$. Naively solving this system can lead to poor performance of either iterative or direct solvers.

A Schur complement decomposition of the linear system can be performed in order to separate the dense and sparse blocks. This may be done by performing a Block-Gauss elimination of Equation (4), and thus solving the following equations in sequence $$(H_{pp} - H_{pn} H_{nn}^{-1} H_{np}) \Delta p = \partial_p H - H_{pn} H_{nn}^{-1} \partial_n H$$

$$H_{nn} \Delta n = \partial_n H - H_{np} \Delta p.$$

Since $H_{nn}$ can be prefactorized by a direct linear solver, the separate solves required on the relatively small number of columns of $H_{np}$, $\partial_n H$ as well as in the second equation, can be performed efficiently using back substitution. Given that the number of parameters of typical animation rigs is relatively small, the cost of the dense solve required to compute $\Delta p$ is negligible.

5. Rig-Space Material Control

As discussed thus far, in one embodiment, the input to the disclosed system may consist of an animation rig and a surface mesh. The surface mesh can be used to define the deformable object that drives the dynamic behavior of the simulation. The material properties of this deformable object can have a large influence on the motions resulting from the system. It is therefore very important to provide an intuitive way for the user to manipulate these parameters. A simple approach would be to allow users to manually adapt the material properties of the simulated finite element mesh, which could be done, for instance, by using a painting interface. This would require an intimate knowledge of the underlying dynamical model, the meaning of the various material parameters, and the coupling between the rig and the simulated object.

To simplify these issues, a novel approach may be used that allows novice users to intuitively influence the material parameters directly in rig-space. This disclosure provides a way for artists to define a stiffness scale value $S_i$ for each rig parameter $p_i$, that roughly corresponds to its desired stiffness relative to the default stiffness of the homogeneous material chosen for the FEM model.

In an initial analysis step, an inhomogeneous stiffness scale distribution $\mu_e$ can be computed overall simulation elements that results in the desired behavior for the rigged object. The distribution found in this step does not change the simulation framework. It only affects the stiffness of the material used during simulations.

Technically, this may be achieved by treating the interior vertices n not as independent DOFs, but as being always in static equilibrium given the boundary conditions defined by the rigged surface points s(p). In other words, every FEM node may be treated as if it was directly controlled by the rig q(p)=(n(p), s(p)). While this explicit map is only known through a nonlinear static solve, it allows analysis of the influence of each rig parameters on the deformation of the entire FEM mesh geometry, and not only the rig-controlled boundary. The derivative of this map may be defined as $$J_q = \frac{\partial q}{\partial p}$$

which can be evaluated with finite differences.

At the rest configuration, q(0), internal elastic forces are zero and their rate of change is described locally by the tangent stiffness matrix $\partial_{qq}W_{int}$. According to Equation (5), and only considering contributions due to internal potential energy, the Hessian $H_{pp}$ becomes:

$$H_{pp} = J_q^T \partial_{qq}W_{int} J_q,$$

where $\partial_{qq}W_{int}$ describes the energy Hessian with respect to all mesh DOFs. The columns of this Hessian describe how a change $\Delta p$ introduces restoring generalized forces $f_p$ that act on the rig parameters as $f_p = -H_{pp}\Delta p$. These restoring generalized forces may be automatically scaled using the user-specified rig-space material parameters $S_i$.

An alternate way of assembling the Hessian $H_{pp}$ is to consider the per element energy contributions $\partial_{qq}W_e$:

$$H_{pp} = J_q^T \left( \sum_e \partial_{qq} W_e \right) J_q$$
$$= \left( \sum_e J_q^T \partial_{qq} W_e J_q \right).$$

In this formulation, the scaling factors $\mu_e$ can now be introduced, for which the aim is to compute per element. These scaling factors have the effect of stiffening or softening each element individually. Formally, it is asked that:

$$SH_{pp} = \Sigma_e J_q^T \partial_{qq} W_e J_q \cdot \mu_e \qquad \text{Equation (6)}$$

where S is the diagonal scaling matrix containing the desired rig stiffness scales $S_i$. In most cases, this is an underdetermined linear system with $p^2/2$ equations and #e unknowns. This system may be solved in a least squares sense using a quadratic programming approach, where there exist inequality constraints $u_e \geq 0$ to obtain positive element stiffnesses and a simple $L^2$-regularizer $\Sigma_e r(\mu_e - 1)^2$ that encourages the use of the default material stiffnesses.

Figure 3:
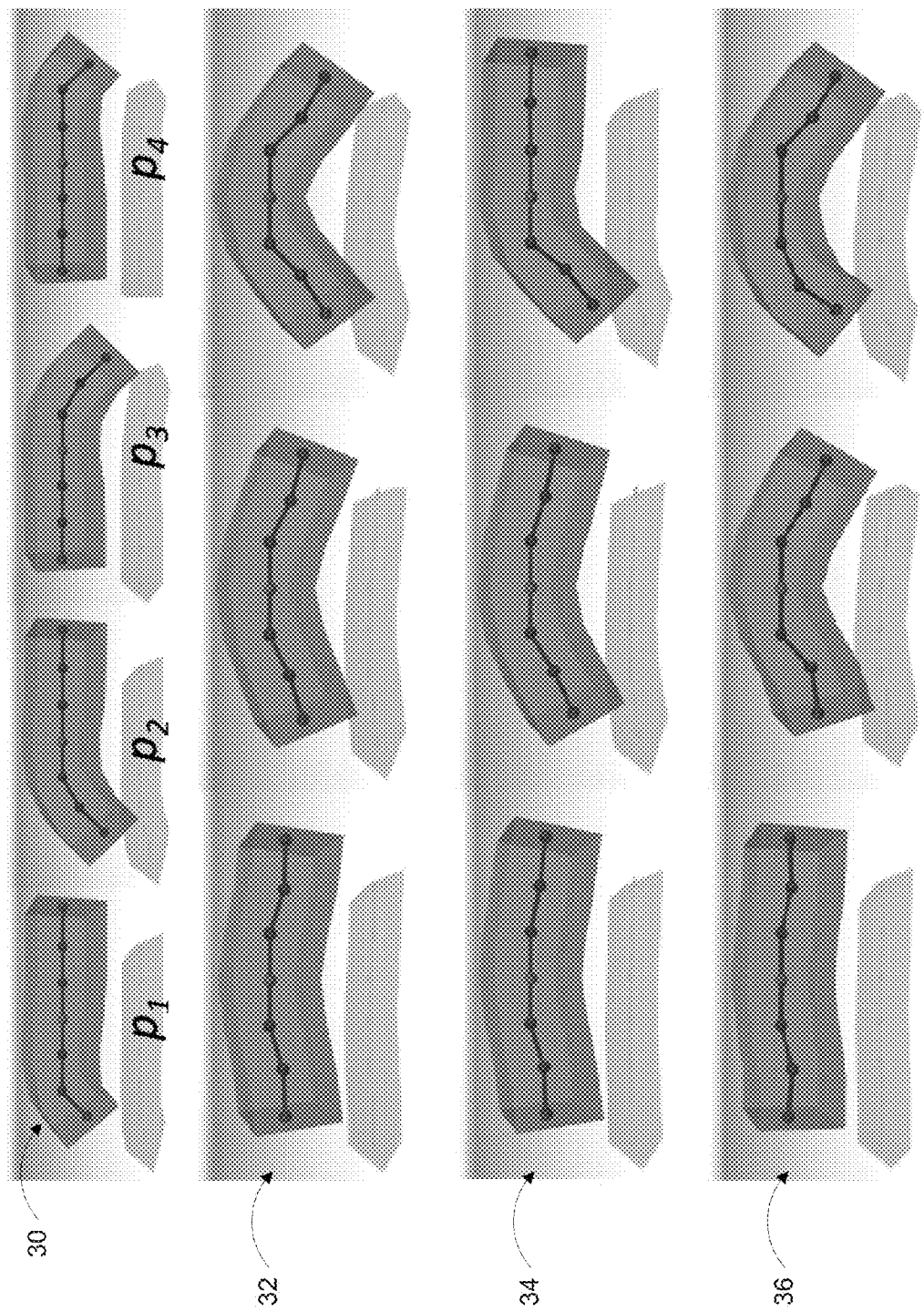
FIG. 3 illustrates a set of elastic bar animation rigs simulated with varying stiffness values.

Geometrically speaking, this approach can anisotropically adapt the elastic energy landscape around the rest shape in order to reflect the desired scaling of the generalized forces. While this analysis may be performed only in the neighborhood of the undeformed configuration, intuitive resulting behaviors for large deformations have also been observed. The example shown in FIG. 3 demonstrates the effectiveness of this method. In FIG. 3, an elastic bar 30 is rigged by four rig deformation modes, affecting the outmosts ($p_1,p_4$), and the combination of the two outer joints ($p_2,p_3$) respectively. In the second row 32, homogeneous materials result in symmetric deformations. In the third row 34, stiffening $p_3$ and $p_4$ results in overall stiffer right part of the bar. In the fourth row 36, stiffening only $p_4$ leads to the expected behavior despite the influence region of $p_3$.

6. Extensions

In the previous sections the simulation framework was described that operates directly in the space of deformations defined by an animation rig. In this section several extensions are discussed that increase the usefulness of the disclosed method.

The disclosed rig-space simulation framework allows a user to easily define high-level rig parameters that combine several low-level deformers. These high-level parameters are often more intuitive to use, as they capture synergies that naturally occur in the motions being created. Such high-level rig parameters capture the main physical deformation modes that the underlying physical object induces on the rig parameters. The high-level parameters exposed to the artist can be used for manual editing of physically-plausible motions or as a further reduced subspace that significantly increases the speed of the simulations.

The results of the simulation in rig-space, $p_i$, provide a space that already captures the non-linearities in vertex space (i.e. $s_i$). An analysis may be performed on data stemming from our rig-space simulation. Alternatively, existing animations can be used to build a model of the rig parameter coupling that artists are accustomed to using.

Figure 4:
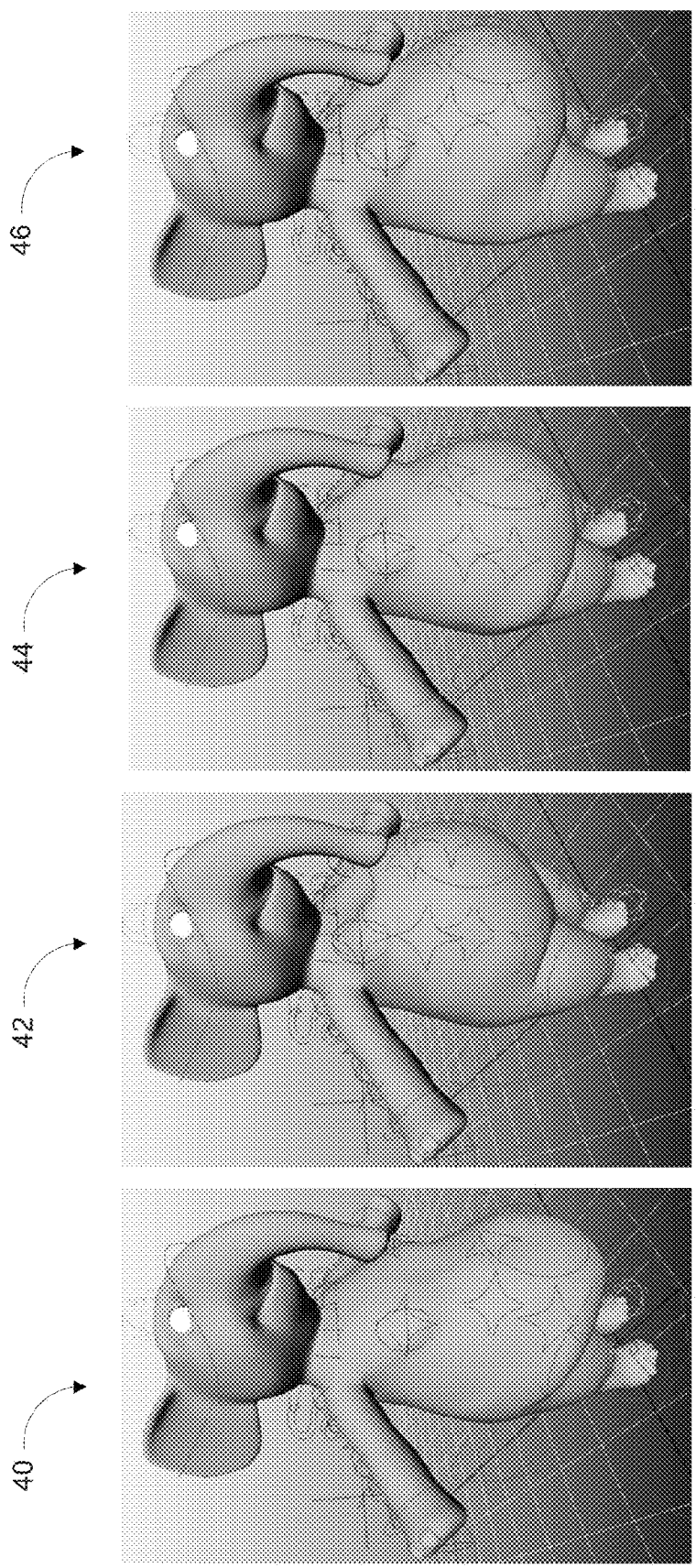
FIG. 4 illustrates a set of four elephant walk animations demonstrating different deformation modes obtained by performing physically-based high-level rig parameter computations.

Since it is desirable for the undeformed configuration p=0 to always be representable in the reduced rig subspace, it can be chosen for the rig parameters p to be represented by the span of column vectors of U, i.e., the representation $$p=Ur,$$

is chosen. The columns of U may be computed straightforwardly as the right singular vectors of the data matrix $P = [p_1, \ldots, p_m]$. As an illustration, different deformation modes obtained by performing this analysis on the belly motion for the elephant walk cycle are given in FIG. 4. For this example, 30 parameters were initially simulated. PCA modes for the elephant's belly rig parameters are provided. The left two images, 40, 42, depict a first mode characterizing vertical motion, while the right two images 44, 46 depict a second mode for horizontal motion.

As already mentioned, these physically-based high-level rig parameters r can be used as a further reduced subspace in order to speed up simulations. Incorporating this subspace into the formulation is very simple: p is simply replaced by Ur in the discrete simulation energy (3) and the chain rule is applied correspondingly for its derivatives.

Inverse kinematics is the process of computing state variables to satisfy higher-level kinematic. A key ingredient of such systems is the definition of a quality measure that eliminates the redundancy that exists when there are more degrees of freedom than there are goals. The physical energy model W(n, s(p)) formulated in rig-space can be naturally used as such a quality measure, independently of the type of rig that is provided as input. Because the physical energy model measures internal deformation on the simulation FEM mesh, virtually all types of rigging methods can be collectively treated in a unified manner. By minimizing $$\min_{p,n} H(n, s(p)) + \alpha \sum_{k \in H} |s_k(p) - h_k|^2, \qquad \text{Equation (7)}$$

where H is a set of handles, the best configuration of rig parameters can be found such that the surface points $s_k$ are as close as possible to the goal positions $h_k$. Using a flexible formulation of H, this inverse kinematics solver can be applied for static modeling but also to add dynamic effects when the momentum terms are considered.

The energy-based formulation defined in (3) allows for switching between dynamic and static solves. The difference between the two consists of the additional momentum terms which can be omitted for static problems.

Since we decouple the treatment of the rigged vertices s(p), and the interior vertices n, this formulation allows for use of different solvers for the two classes of degrees of freedom. It is possible, for instance, to use a static solve for the interior vertices, while using a dynamic solve for the rig parameters. In this case, during each time step, the interior points aim to reach a static equilibrium configuration due to absence of any mass and momentum. This strategy gives intuitive results for rigged objects that are meant to be more rigid. If, however, the mass term is kept for the interior points, more complex (and interesting) secondary motion effects may be achieved, such as waves that propagate through the solid and affect the free DOFs of the rigged surface. This approach works best for rigged objects that are meant to be softer. The option of using either strategy may be exposed as a high level control parameter to the users of the disclosed system.

7. Results

The disclosed framework provides animators with a helpful tool that can be used to enhance their existing rigged animations with physical effects and to create controllable animation of deformable objects. The approach is particularly attractive for animators since it can be seamlessly integrated in their workflow. As such, editing and post-processing of simulation results becomes as effortless as editing any other existing keyframed animation.

The effectiveness of the method is demonstrated by animating several simple rigs that are used to showcase various concepts. In addition, two artist created rigs, Prof. Peanuts and Flower, are animated.

Figure 5:
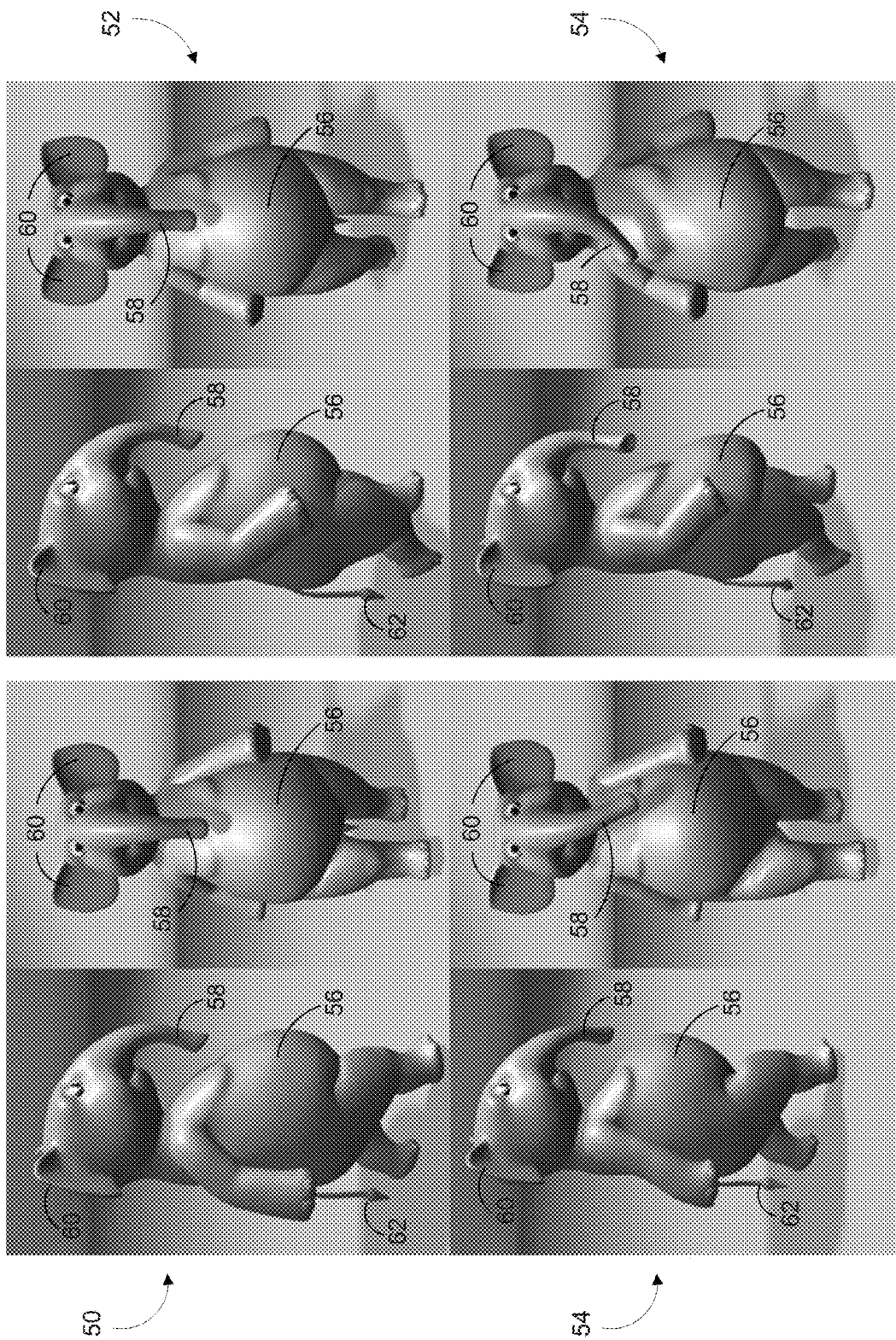
FIG. 5 illustrates a comparison of artist-generated animation examples (top row) and an animation in which (secondary) motion is computed automatically using the disclosed method (bottom row).

To demonstrate the benefit of the approach on a practical example, it is applied to an artist-created walk cycle animation of Prof. Peanuts. FIG. 5 compares a simulated animation to the coarse input animation provided by the artist. The top row provides two different views of two artist-rigged examples, 50 and 52. The bottom row 54 shows the result of the disclosed method with simulated rig parameters for the belly, shoulder, trunk, and tail. Simply specifying a subset of rig parameters to be simulated, in addition to the input animation, allows the disclosed framework to enrich the provided coarse motion with many interesting physical details. This can be seen in the motion of the belly 56, trunk 58, ears 60 and tail 62 of the elephant, which are largely absent in the artist-rigged examples 50 and 52.

Figure 6:
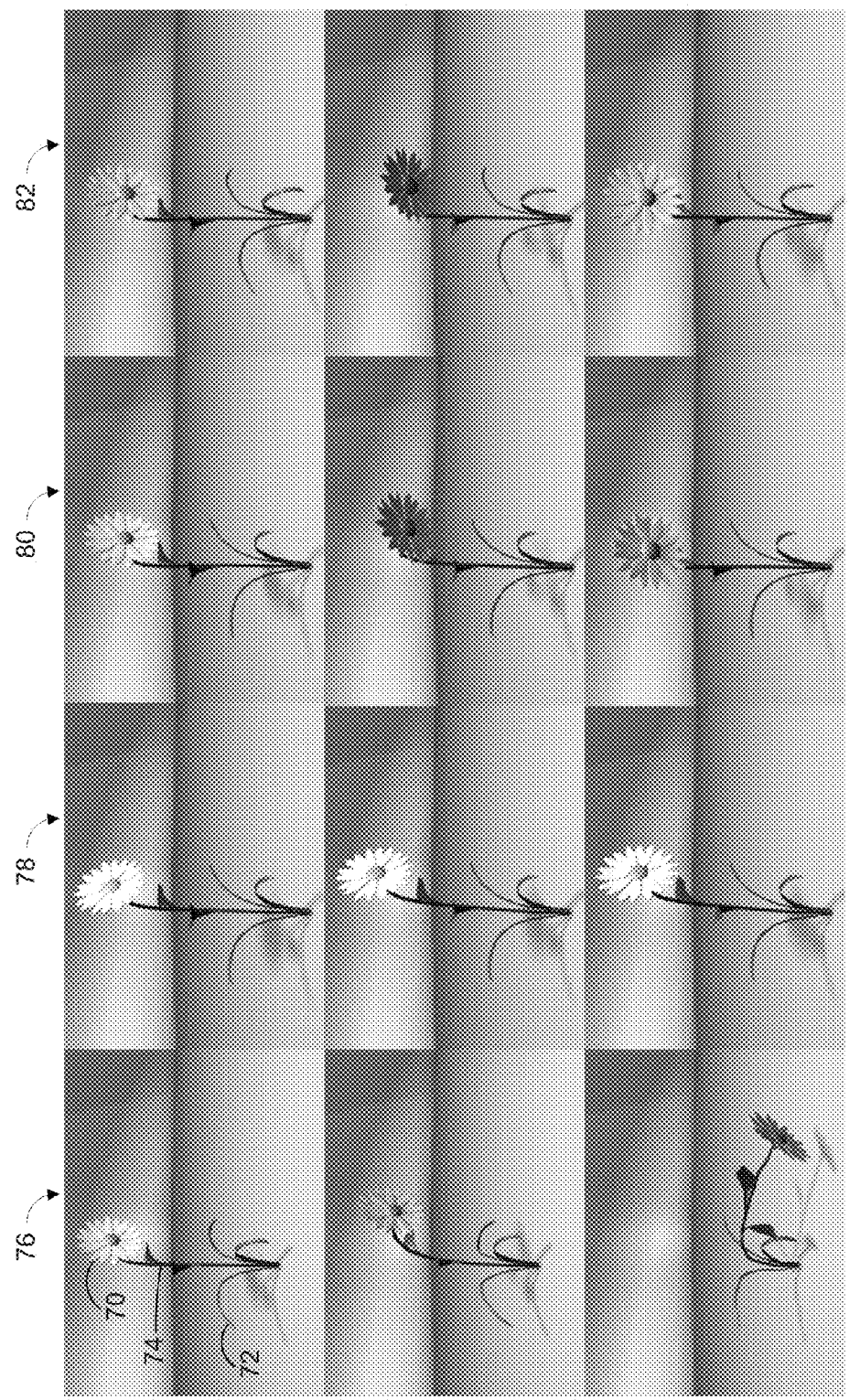
FIG. 6 illustrates a rigged flower simulated with different rig stiffness parameters.

The disclosed rig-based material model enhances the basic simulation framework presented in Section 3 by allowing the artist to specify individual stiffnesses for each rig parameter. This enriches the space of dynamic behaviors that can be generated and also allows for more accurate control over the elastic characteristics of individual parts of the rigged characters. FIG. 6 shows the approach applied to the Flower rig. In each column of FIG. 6, the rigged flower is simulated with different rig stiffness parameters. In the first column 76, the blossom 70, leaves 72, and stem 74 are all simulated as homogeneous soft material, resulting in the entire flower dropping. In the second column 78, the entire flower is simulated with homogeneous stiff material. In the third column 80, soft material is used for the blossom 70 while the leaves 72 and stem are stiff. Finally, in the fourth column 80, soft material is simulated for the blossom 70 and leaves 72, while the stem 74 is stiff. Neither uniformly stiff (78) nor uniformly soft (76) materials give satisfactory results. However, selectively weakening the blossom 70 and the leafs 72, while maintaining the stiffness of the stem 74, as in the fourth column 82, leads to a desirable behavior.

The disclosed rig-based approach also allows for a user to quickly iterate over animation sequences and simulate individual parts of the rig separately. Although this can potentially lead to a loss of interesting coupling between different parts of the rig, the gain in simulation speed can be significant. While using this mode of operation, the result of a previous simulation may be taken as an input keyframed sequence and treated as boundary condition for the free rig parameters. This technique has been applied for the sequence shown in FIGS. 1 and 5, which were discussed previously.

Figure 9:
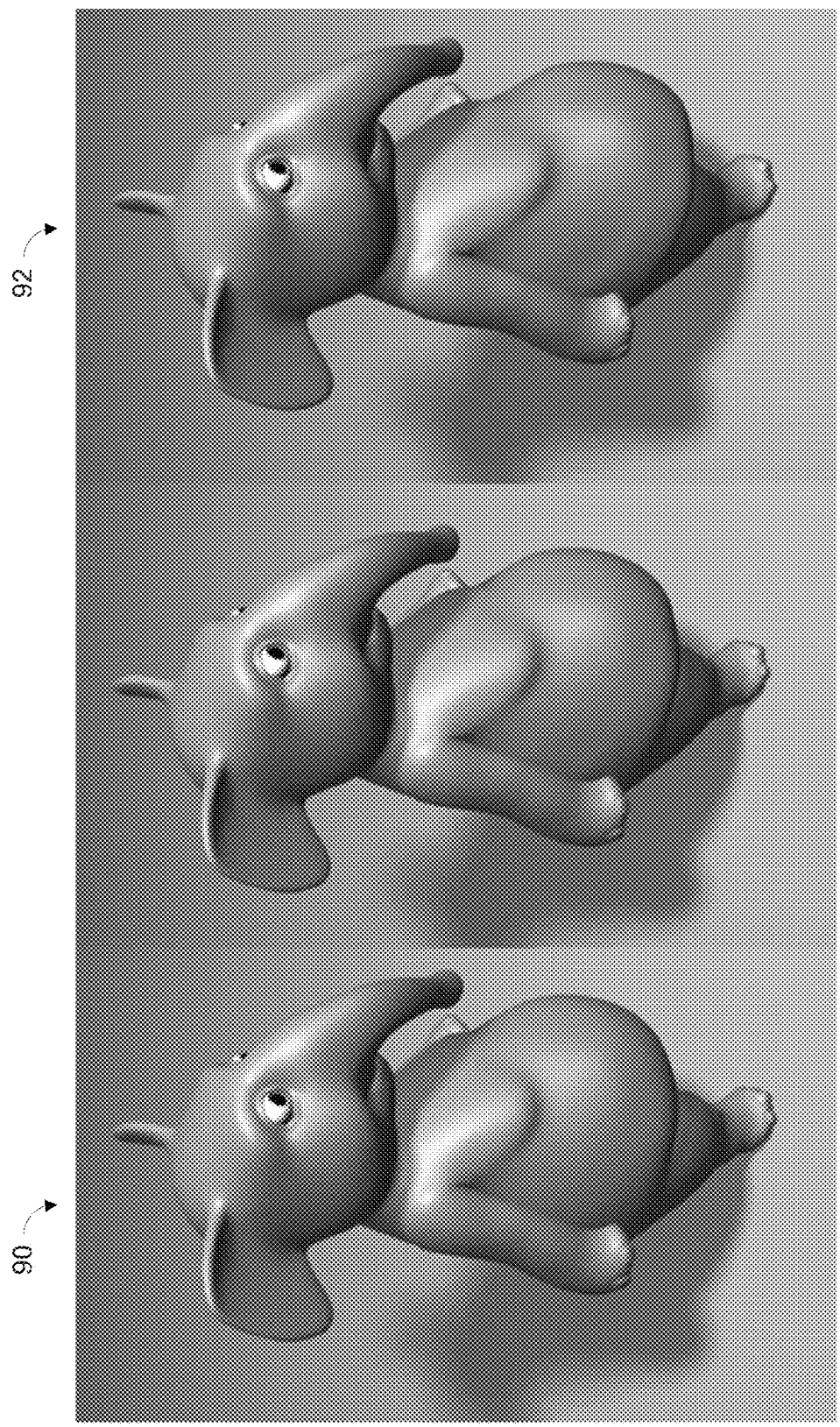
FIG. 9 illustrates a set of animations showing the effect of changing high-level rig parameter scaling to affect the animation.

To further enhance the artist's editing capabilities, and to enforce the concept of keeping the animator in the loop, a PCA-based approach automatically determines additional, physically meaningful control parameters. For the walk cycle example shown in FIG. 5, the main two modes capture most of the elastic deformation of the belly during the walk. By manipulating these high-level parameters, animators can easily edit the animation curves generated by our system, in order to emphasize or reduce their effect, as illustrated in FIG. 9. In FIG. 9, a high-level rig parameter is scaled up (90) and down (92) by a factor of 1.5 to amplify or attenuate the belly motion. This manual editing process allows for greater user control while still resulting in plausible-looking motions.

Figure 7:
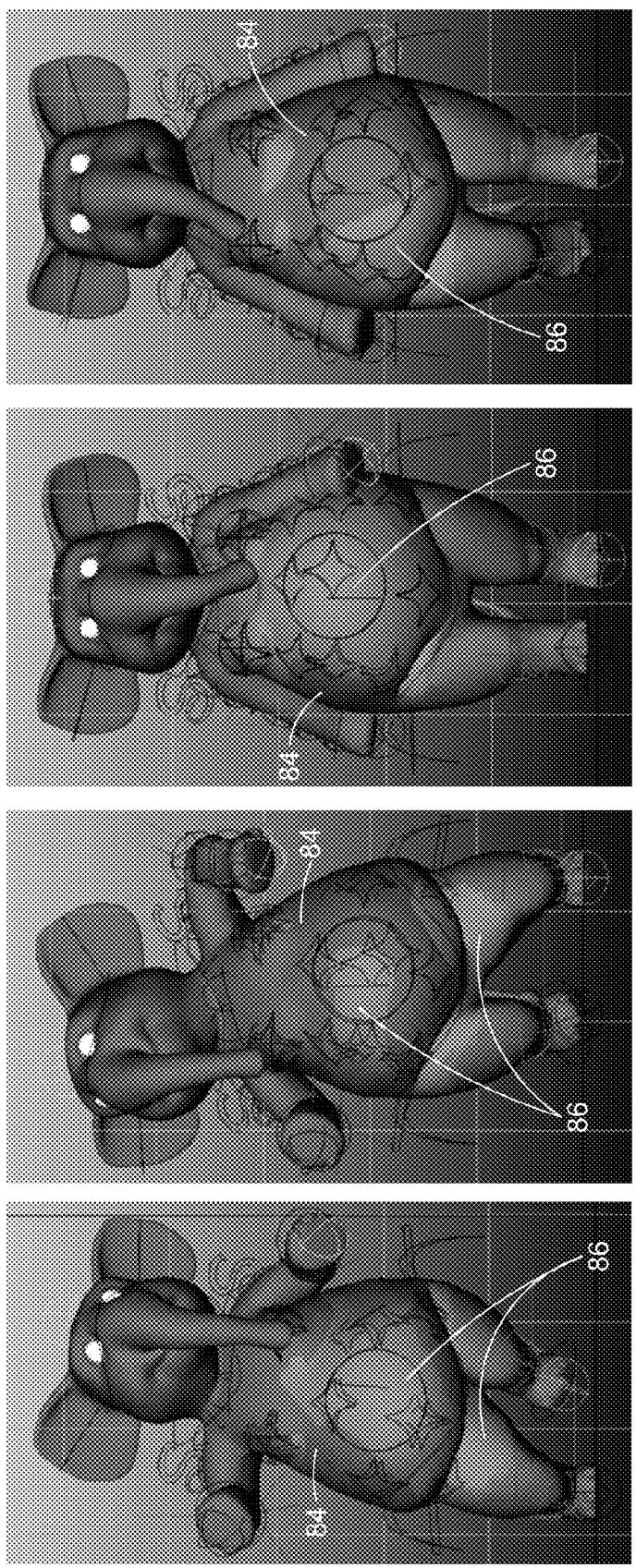
FIG. 7 illustrates a comparison of a simulation performed with a full set of parameters and a simulation performed using a reduced space of high-level rig parameters.

The high-level rig parameters exposed also provide a convenient space for simulations to work with. As will be discussed shortly, this significantly decreases the computational overhead of the disclosed method. However, it is important to ensure that this does not negatively impact the quality of results. To test this, the belly of the dancing elephant was simulated using the subspace built from the walk sequence of FIG. 5. The experiment was repeated by then animating the walk sequence using the subspace obtained by simulating the full set of belly parameters for the dance motion of FIG. 1. In both cases, the high-level rig parameters proved to generalize very well, and the visual differences between performing the simulations in the reduced space, or with the full set of parameters is almost unperceivable. This is illustrated in FIG. 7. The overlay of the darker original simulation 84 (thirty DOFs) and the lighter reduced simulation 86 (six DOFs) shows the good approximation quality of the high-level controllers.

Figure 8:
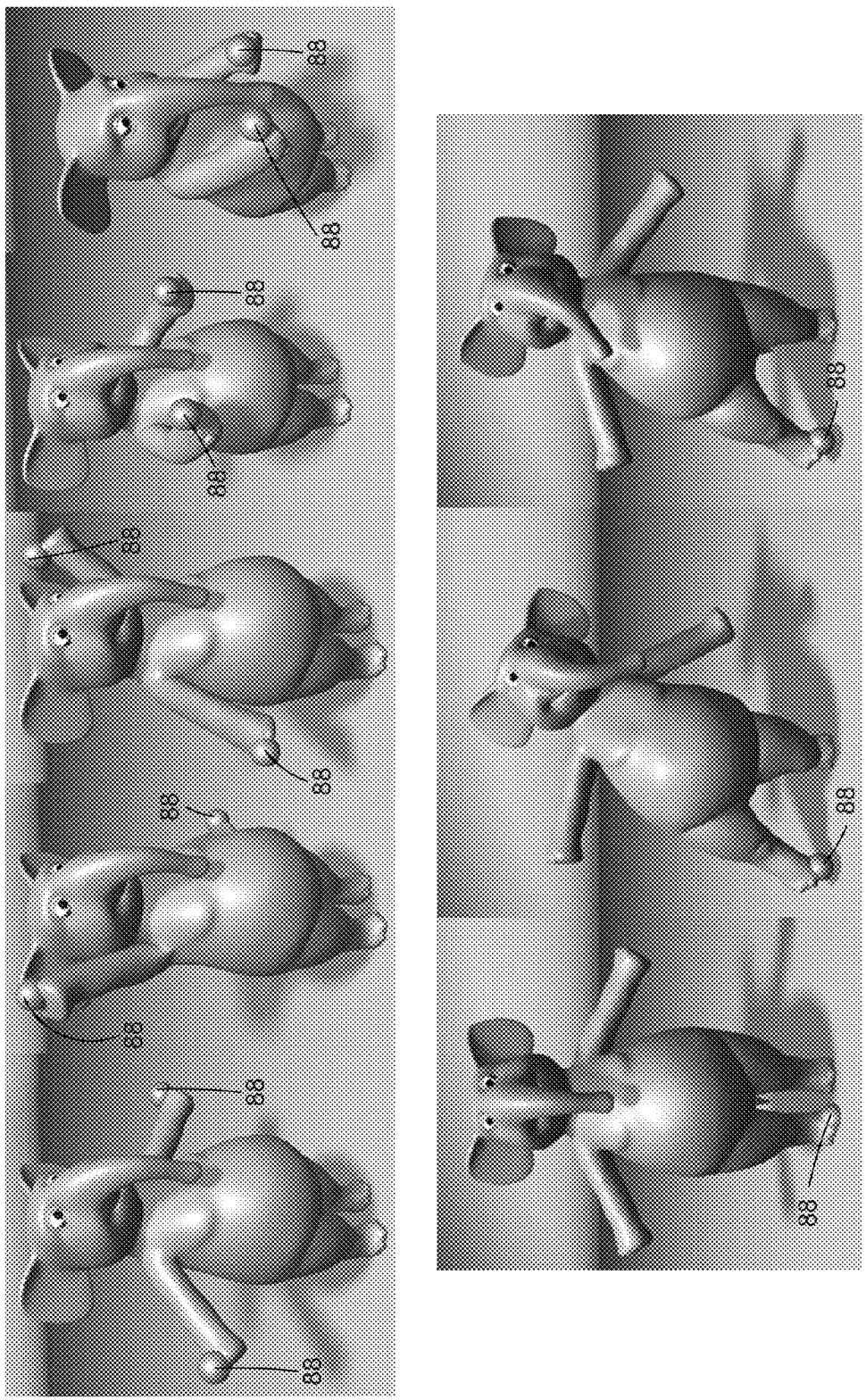
FIG. 8 illustrates an example of different inverse kinematics edits at deformation handles depicted as spheres.

Defining the elastic energy on the background FE mesh and working on abstract rig mappings s(p) allows for the performance of inverse kinematics operations on arbitrary rigged objects. The sequence in FIG. 8 was created by providing several handle trajectories using deformation handles 88, which are depicted as spheres, as described in Section 6. For the editing process, secondary motion can either be enabled or disabled (non-zero or zero mass matrices $M_n$ and $M_s$ in Equation 3, respectively), depending on the application.

Figure 10:
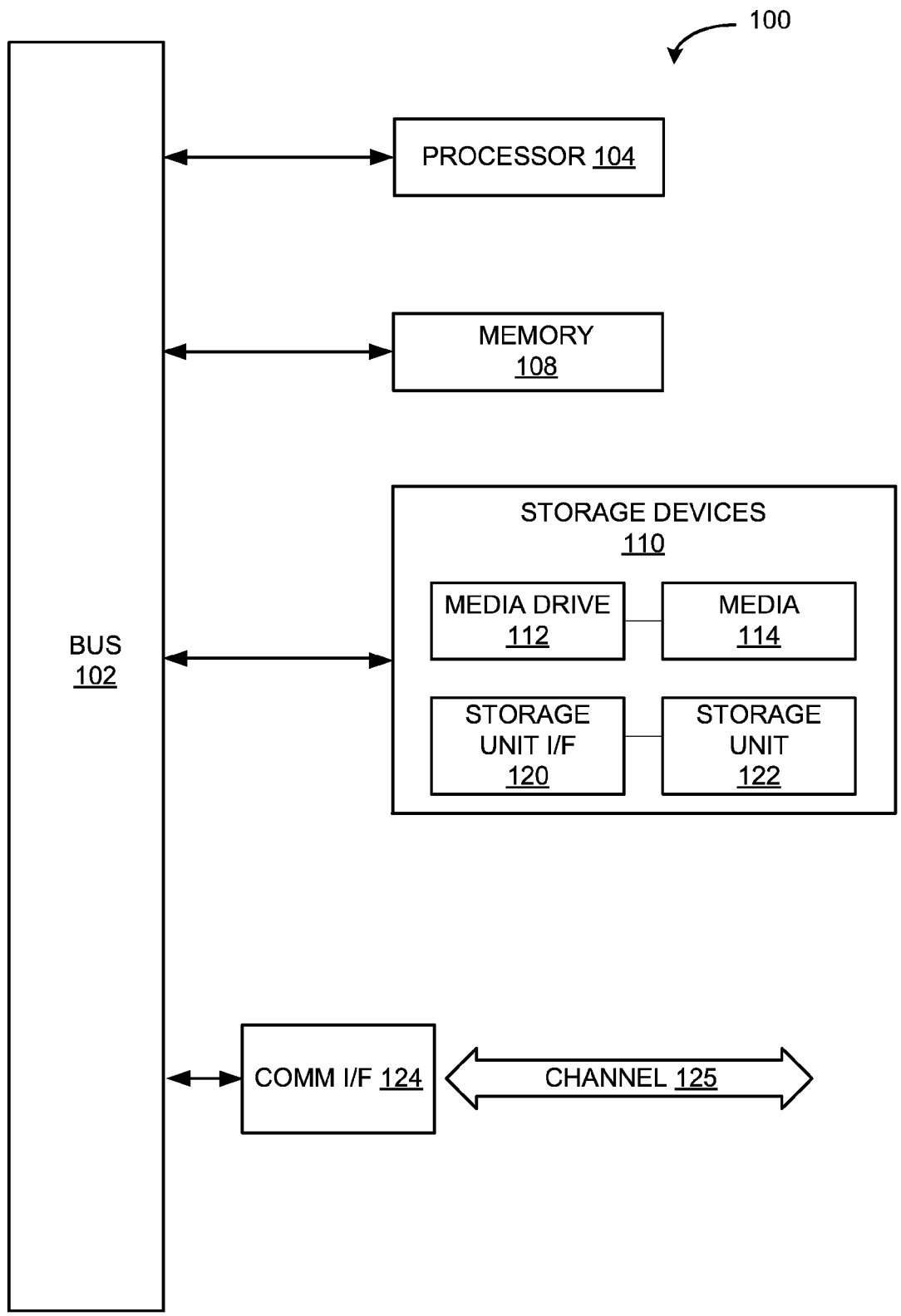
FIG. 10 illustrates an example computing module that may be used in implementing various features of embodiments of the methods described herein.

The disclosed methods and techniques may be implemented in whole or in part using software. In one embodiment, these software elements can be implemented to operate with a computing or processing module capable of carrying out the functionality described with respect thereto. One such example computing module is shown in FIG. 10. Various embodiments are described in terms of this example-computing module 100. After reading this description, it will become apparent to a person skilled in the relevant art how to implement the disclosure using other computing modules or architectures.

Referring now to FIG. 10, computing module 100 may represent, for example, computing or processing capabilities found within desktop, laptop and notebook computers; hand-held computing devices (PDA's, smart phones, tablets, cell phones, palmtops, etc.); mainframes, supercomputers, workstations or servers; or any other type of special-purpose or general-purpose computing devices as may be desirable or appropriate for a given application or environment. Computing module 100 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 100 might include, for example, one or more processors, controllers, control modules, or other processing devices, such as a processor 104. Processor 104 might be implemented using a general-purpose or special-purpose processing engine such as, for example, a microprocessor, controller, or other control logic. In the illustrated example, processor 104 is connected to a bus 102, although any communication medium can be used to facilitate interaction with other components of computing module 100 or to communicate externally.

Computing module 100 might also include one or more memory modules, simply referred to herein as main memory 108. For example, random access memory (RAM) or other dynamic memory might be used for storing information and instructions to be executed by processor 104. Main memory 108 might also be used for storing temporary variables or other intermediate information during execution of instructions to be executed by processor 104. Computing module 100 might likewise include a read only memory ("ROM") or other static storage device coupled to bus 102 for storing static information and instructions for processor 104.

The computing module 100 might also include one or more various forms of information storage mechanism 110, which might include, for example, a media drive 112 and a storage unit interface 120. The media drive 112 might include a drive or other mechanism to support fixed or removable storage media 114. For example, a hard disk drive, a floppy disk drive, a magnetic tape drive, an optical disk drive, a CD or DVD drive (R or RW), or other removable or fixed media drive might be provided. Accordingly, storage media 114 might include, for example, a hard disk, a floppy disk, magnetic tape, cartridge, optical disk, a CD or DVD, or other fixed or removable medium that is read by, written to or accessed by media drive 112. As these examples illustrate, the storage media 114 can include a computer readable storage medium having stored therein computer software or data.

In alternative embodiments, information storage mechanism 110 might include other similar instrumentalities for allowing computer programs or other instructions or data to be loaded into computing module 100. Such instrumentalities might include, for example, a fixed or removable storage unit 122 and an interface 120. Examples of such storage units 122 and interfaces 120 can include a program cartridge and cartridge interface, a removable memory (for example, a flash memory or other removable memory module) and memory slot, a PCMCIA slot and card, and other fixed or removable storage units 122 and interfaces 120 that allow software and data to be transferred from the storage unit 122 to computing module 100.

Computing module 100 might also include a communications interface 124. Communications interface 124 might be used to allow software and data to be transferred between computing module 100 and external devices. Examples of communications interface 124 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 124 might typically be carried on signals, which can be electronic, electromagnetic (which includes optical) or other signals capable of being exchanged by a given communications interface 124. These signals might be provided to communications interface 124 via a channel 128. This channel 128 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer readable medium" and "computer usable medium" are used to generally refer to media such as, for example, main memory 108, storage unit interface 120, storage media 114, and channel 128. These and other various forms of computer readable media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 100 to perform features or functions of the present disclosure as discussed herein.

Figure 11:
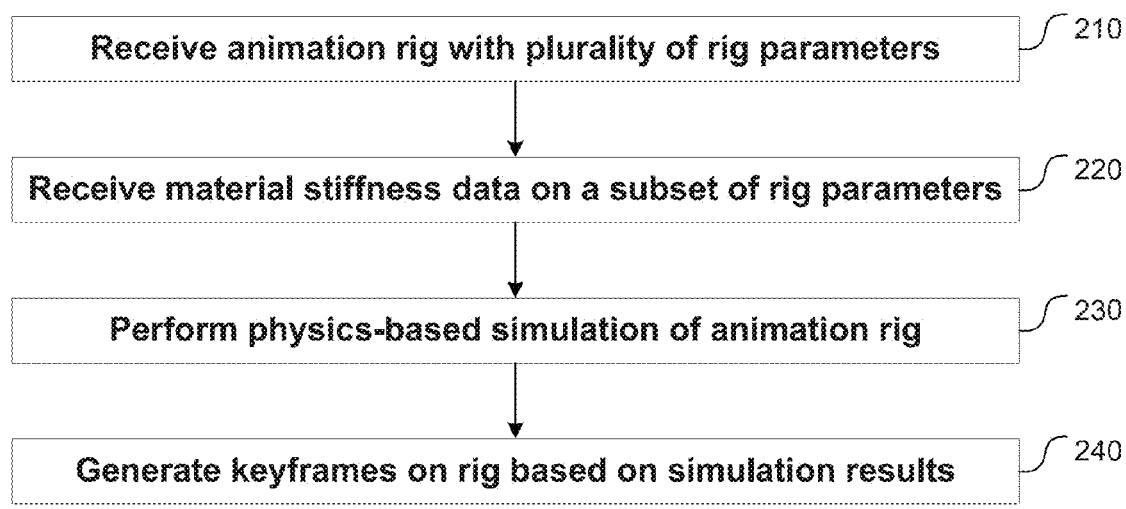
FIG. 11 illustrates an example process for generating keyframes on an animated rig in accordance with one embodiment of the systems and methods described herein.

FIG. 11 illustrates an example process for generating keyframes on an animation rig based on a physics-based simulation, in accordance with one embodiment of the systems and methods described herein. At operation 210, an animation rig comprising a plurality of rig parameters is received. This animation rig defines a deformation space for an attached surface mesh, the surface mesh comprising a plurality of nodes. At operation 220, material stiffness data is received on a subset of the rig parameters. At operation 230, a physics-based simulation is performed using the rig parameters and the material stiffness data. The simulation is constrained by the deformation space of the rig, as defined by the rig parameters, and the rigidity data influences the results of the simulation. Finally, at operation 240, keyframes are generated on the animation rig based on the results of the simulation run at operation 230.

While various embodiments of the application have been described above, it should be understood that they have been presented by way of example only, and not of limitation. Likewise, the various diagrams may depict an example architectural or other configuration for the application, which is done to aid in understanding the features and functionality that can be included in the application. The application is not restricted to the illustrated example architectures or configurations, but the desired features can be implemented using a variety of alternative architectures and configurations. Indeed, it will be apparent to one of skill in the art how alternative functional, logical or physical partitioning and configurations can be used to implement the desired features of the present application. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the application, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The framework presented allows animators to exploit the benefits of dynamic simulations without any change to the typical workflow they follow when creating animations. The disclosed method can treat any animation rig as a black-box, non-linear map between a high-level set of rig parameters and the vertices of the mesh being animated. The output of the method can be a set of animation curves that are virtually identical to the ones created by animators through keyframing. The effectiveness of the method was demonstrated using Maya rigs. In particular, two of the examples shown consist of complex rigs that allow for a large space of deformations. To increase the usefulness of the method, a method was disclosed that allows animators to non-homogeneously change the stiffness of each rig parameter.

The animation curves produced by the disclosed system can readily be edited by artists. Scaling the animation curves in their entirety emphasizes or reduces the physical effects that are introduced. Incorporating balance control strategies at the level of the dynamical system being simulated could lead to rigged characters that are capable of autonomously reacting to collisions with other virtual objects, without requiring additional artist input.

Although the disclosure has been presented with reference only to the presently preferred embodiments, those of ordinary skill in the art will appreciate that various modifications can be made without departing from this disclosure. Accordingly, this disclosure is defined only by the following claims.

The invention claimed is:

1. A method comprising:
   receiving an animation rig with a plurality of rig parameters, the rig parameters defining a deformation space for an attached surface mesh, the attached surface mesh comprising a plurality of nodes;
   receiving material stiffness data on a subset of the rig parameters, the material stiffness data defining a stiffness scale value for each of the subset of the rig parameters, wherein the stiffness scale value is relative to a stiffness of a homogeneous material chosen for a finite element method model derived from the attached surface mesh,
   using the rig and the material stiffness data to influence a physics-based simulation of the effects of one or more of gravity, inertia, and penalty-collisions on the subset of the rig parameters, wherein the physics-based simulation of the effects of one or more of gravity, inertia, and penalty-collisions is constrained by the deformation space of the rig; and
   generating a plurality of keyframes for some or all of the rig parameters of the animation rig as a result of the physics-based simulation of the effects of one or more of gravity, inertia, and penalty-collisions on the subset of the rig parameters.

2. The method of claim 1, further comprising analyzing the simulation to create a set of high-level rig parameters, each high-level rig parameter being a combination of two or more of the rig parameters.

3. The method of claim 2, further comprising using one or more of the high-level rig parameters to influence a second physics-based simulation; and
   generating keyframes on the animation rig as a result of the second simulation.

4. The method of claim 1, further comprising using one or more of the rig parameters to perform inverse kinematics calculations on the animation rig.

5. The method of claim 4, wherein the rig parameters can be used to calculate an elastic energy, and
   further wherein, using one or more of the rig parameters to perform inverse kinematics calculations on the animation rig comprises
      receiving position values for a subset of the surface mesh nodes, and
      calculating the remaining surface mesh node position values such that the elastic energy in the deformation space is substantially minimized.

6. A method comprising:
   receiving an animation rig with a plurality of rig parameters, the rig parameters defining a deformation space for an attached surface mesh, the attached surface mesh comprising a plurality of nodes;

receiving material stiffness data on a subset of the rig parameters, the material stiffness data defining a stiffness scale value for each of the subset of the rig parameters, wherein the stiffness scale value is relative to a stiffness of a homogeneous material chosen for a finite element method model derived from the attached surface mesh;

performing a physics-based simulation of the effects of one or more of gravity, inertia, and penalty-collisions on the subset of the rig parameters, wherein the physics-based simulation of the effects of one or more of gravity, inertia, and penalty-collisions is constrained by the deformation space; and generating a plurality of keyframes for the rig based on the results of the physics-based simulation of the effects of one or more of gravity, inertia, and penalty-collisions on the subset of the rig parameters.

7. The method of claim 6 further comprising receiving material stiffness data relating to the parameters, wherein the simulation is both constrained by the deformation space and influenced by the material stiffness data.

8. The method of claim 7, further comprising analyzing the simulation to create a set of high-level rig parameters, each high-level rig parameter being a combination of two or more of the rig parameters.

9. The method of claim 8, further comprising using one or more of the high-level rig parameters to influence a second physics-based simulation; and generating keyframes on the animation rig as a result of the second simulation.

10. The method of claim 6, further comprising using one or more of the rig parameters to perform inverse kinematics calculations on the animation rig.

11. The method of claim 10, wherein the rig parameters can be used to calculate an elastic energy, and further wherein, using one or more of the rig parameters to perform inverse kinematics calculations on the animation rig comprises receiving position values for a subset of the surface mesh nodes, and calculating the remaining surface mesh node position values such that the elastic energy in the deformation space is substantially minimized.

12. A non-transitory computer readable medium comprising an instruction set configured to cause a computing device to perform:

receiving an animation rig with a plurality of rig parameters, the rig parameters defining a deformation space for an attached surface mesh, the attached surface mesh comprising a plurality of nodes;

receiving material stiffness data on a subset of the rig parameters, the material stiffness data defining a stiffness scale value for each of the subset of the rig parameters, wherein the stiffness scale value is relative to a stiffness of a homogeneous material chosen for a finite element method model derived from the attached surface mesh;

using the rig and the material stiffness data to influence a physics-based simulation of the effects of one or more of gravity, inertia, and penalty-collisions on the subset of the rig parameters, wherein the physics-based simulation of the effects of one or more of gravity, inertia, and penalty-collisions is constrained by the deformation space of the rig; and generating a plurality of keyframes for some or all of the rig parameters of the animation rig as a result of the physics-based simulation of the effects of one or more of gravity, inertia, and penalty-collisions on the subset of the rig parameters.

13. The non-transitory computer readable medium of claim 12, wherein the instruction set is further configured to cause a computing device to perform analyzing the simulation to create a set of high-level rig parameters, each high-level rig parameter being a combination of two or more of the rig parameters.

14. The non-transitory computer readable medium of claim 13, wherein the instruction set is further configured to cause a computing device to perform:

using one or more of the high-level rig parameters to influence a second physics-based simulation; and generating keyframes on the animation rig as a result of the second simulation.

15. The non-transitory computer readable medium of claim 12, wherein the instruction set is further configured to cause a computing device to perform using one or more of the rig parameters to perform inverse kinematics calculations on the animation rig.

16. The non-transitory computer readable medium of claim 15, wherein the rig parameters can be used to calculate an elastic energy, and further wherein, using one or more of the rig parameters to perform inverse kinematics calculations on the animation rig comprises receiving position values for a subset of the surface mesh nodes, and calculating the remaining surface mesh node position values such that the elastic energy in the deformation space is substantially minimized.

17. A non-transitory computer readable medium comprising an instruction set configured to cause a computer device to perform:

receiving an animation rig with a plurality of rig parameters, the rig parameters defining a deformation space for an attached surface mesh, the attached surface mesh comprising a plurality of nodes;

receiving material stiffness data on a subset of the rig parameters, the material stiffness data defining a stiffness scale value for each of the subset of the rig parameters, wherein the stiffness scale value is relative to a stiffness of a homogenous material chosen for a finite element method model derived from the attached surface mesh;

performing a physics-based simulation of the effects of one or more of gravity, inertia, and penalty-collisions on the subset of the rig parameters, wherein the physics-based simulation of the effects of one or more of gravity, inertia, and penalty-collisions is constrained by the deformation space; and generating a plurality of keyframes for the animation rig based on the results of the physics-based simulation of the effects of one or more of gravity, inertia, and penalty-collisions on the subset of the rig parameters.

18. The non-transitory computer readable medium of claim 17, wherein the instruction set is further configured to cause a computer device to perform the step of receiving material stiffness data relating to the parameters, and further wherein the simulation is both constrained by the deformation space and influenced by the material stiffness data.

19. The non-transitory computer readable medium of claim 18, wherein the instruction set is further configured to cause a computing device to perform analyzing the simulation to create a set of high-level rig parameters, each high-level rig parameter being a combination of two or more of the rig parameters.

20. The non-transitory computer readable medium of claim 19, wherein the instruction set is further configured to cause a computing device to perform:
   using one or more of the high-level rig parameters to influence a second physics-based simulation; and
   generating keyframes on the animation rig as a result of the second simulation.

21. The non-transitory computer readable medium of claim 17, wherein the instruction set is further configured to cause a computing device to perform using one or more of the rig parameters to perform inverse kinematics calculations on the animation rig.

* * * * *